United States Patent [19]
Buy et al.

[11] Patent Number: 5,765,285
[45] Date of Patent: Jun. 16, 1998

[54] METHOD OF BENDING A RIGID THERMOPLASTIC PIPE

[75] Inventors: David C. Buy, North Ridgeville; Girish Trikamlal Dalal, Avon Lake, both of Ohio

[73] Assignee: The B.F. Goodrich Company, Akron, Ohio

[21] Appl. No.: 841,091

[22] Filed: Apr. 29, 1997

Related U.S. Application Data

[63] Continuation of Ser. No. 513,190, Aug. 9, 1995, abandoned.

[51] Int. Cl.[6] .................................................. B23P 17/00
[52] U.S. Cl. ...................... 29/890.149; 29/505; 72/369; 138/140
[58] Field of Search .................... 29/890.14, 890.149, 29/505; 138/140, 153, 172, 177, DIG. 7, DIG. 8, DIG. 11; 264/241, 249, 339; 72/369

[56] References Cited

U.S. PATENT DOCUMENTS

| | | | |
|---|---|---|---|
| 2,435,904 | 2/1948 | Robaus | 29/890.149 |
| 2,774,384 | 12/1956 | Wallace | 138/140 |
| 4,377,894 | 3/1983 | Yoshida | 138/140 |
| 4,759,111 | 7/1988 | Cudini | 138/140 |
| 4,903,735 | 2/1990 | Delacour et al. | |
| 5,407,613 | 4/1995 | Schulte | |
| 5,424,015 | 6/1995 | Matsuda et al. | |
| 5,433,902 | 7/1995 | Leyderman | |

FOREIGN PATENT DOCUMENTS

| | | | |
|---|---|---|---|
| 1265972 | 4/1968 | Germany | |
| 2442419 | 3/1976 | Germany | 72/369 |
| 16079 | 12/1972 | Japan | 264/339 |
| 171526 | 10/1982 | Japan | 72/369 |
| 99725 | 4/1989 | Japan | 72/369 |
| 04265730 | 2/1991 | Japan | |
| 138728 | 6/1993 | Japan | 264/339 |
| 137468 | 5/1994 | Japan | 138/140 |

OTHER PUBLICATIONS

English abstracts for the Japanese and German patents. Applicant does not have the translations of these patents.
Wirsbo Rodipex® advertising piece.
Pacific Pipe Co. Pipe & Tube Bending advertising piece.
Encircle Tube & Pipe Bending advertising piece.
BendTec Tube & Pipe Bending advertising piece.
Tulsa Tube Bending advertising piece.

*Primary Examiner*—David P. Bryant
*Attorney, Agent, or Firm*—Helen A. Odar

[57] ABSTRACT

The present invention relates to a method of forming a sharp small radius bend in a rigid thermoplastic pipe having a close fitting metal sleeve without kinking or cracking in the thermoplastic at the bend. Furthermore, the invention comprises a rigid thermoplastic pipe having a metal sleeve with a bend formed in the area of the sleeve.

9 Claims, 1 Drawing Sheet

METHOD OF BENDING A RIGID THERMOPLASTIC PIPE

This is a continuation of application Ser. No. 08/513,190, filed Aug. 9, 1995, now abandoned.

FIELD OF INVENTION

This invention relates to rigid thermoplastic pipes. In particular, the present invention relates to a method for bending the rigid thermoplastic pipe and the resulting bent pipe.

BACKGROUND OF THE INVENTION

Generally, rigid thermoplastic pipe cannot be bent without kinking or cracking the rigid thermoplastic pipe at the bend. The kinking or cracking occurs because the outer fiber tensile stress, as defined in ASTM-D638, on the outer surface of the rigid thermoplastic pipe exceeds the tensile stress at yield for the particular thermoplastic. Bending the rigid thermoplastic pipe, weakens the pipe and may cause the pipe to burst when it is subject to long term pressure.

Various methods have been used to bend rigid thermoplastic pipes without kinking or cracking the thermoplastic pipe at the bend. Most of these methods require the thermoplastic pipe to be heated to a temperature in which the pipe could be plastically deformed. For example, U.S. Pat. No. 5,407,613 to Schulte teaches a process and apparatus for bending plastic pipe. In this patent, Schulte heats the pipe which is to be bent to a temperature at which it can be plastically deformed. The pipe is then placed into a pipe shaped channel which is defined by two grooves formed in the adjacent surfaces of separable dies of a bending tool. The length of the pipe shaped channel corresponds to the desired length of the bend to be made and a radius corresponding to the radius of the pipe. A cooling agent flows through the pipe while it still is in the bending tool to quickly cool the pipe in its bent position.

Japanese Patent No. 04265730 A also discloses a method of bending a rigid thermoplastic pipe by usage of heat. In this reference, a coil spring is inserted into a portion of the rigid thermoplastic pipe to be bent. The portion to be bent is then heated and the rigid thermoplastic pipe set in a mold having a groove corresponding to the final desired bend. After cooling the rigid thermoplastic pipe in the mold, it is removed from the mold. Finally, the coil spring is removed from the rigid thermoplastic pipe.

These methods are cumbersome and difficult to use in the field. Moreover, these methods require the heating and cooling of the rigid thermoplastic pipe which may take some time. Furthermore, there are many problems with these methods. If the rigid thermoplastic pipes are improperly heated or cooled too quickly the thermoplastic material itself may be weakened or the rigid thermoplastic pipe may be deformed or have a non-uniform radius.

Thus, there currently exists a need for a better solution than any disclosed above for a method to bend a rigid thermoplastic pipe without cracking or kinking the thermoplastic pipe which would result in eventual failure of the rigid thermoplastic pipe when it is subject to pressure. In particular, a need exist for a method which is simple, quick, not cumbersome and does not involve many steps or pieces of equipment for easy use in the field.

SUMMARY OF THE INVENTION

The method of the present invention comprises forming a sharp small radius bend in a rigid thermoplastic pipe without kinking or cracking at the bend. Moreover, the method is simple and does not require the heating of the rigid thermoplastic pipe.

In particular, the method comprises slipping a section of a close fitting metal sleeve or tube over the rigid thermoplastic pipe and then bending the rigid thermoplastic pipe on the sleeve without kinking or cracking at the bend In a preferred embodiment of the present invention, an aluminum sleeve is slipped over a length of rigid chlorinated polyvinyl chloride (CPVC) pipe and a sharp radius bend is formed on the section of pipe covered by the sleeve.

In addition, the present invention comprises a rigid thermoplastic pipe having a metal sleeve with a bend formed according to the above method in which the composite structure is stronger in pressure and temperature bearing properties as compared to the rigid thermoplastic pipe itself without a sleeve.

DETAILED DESCRIPTION

Figure 1:
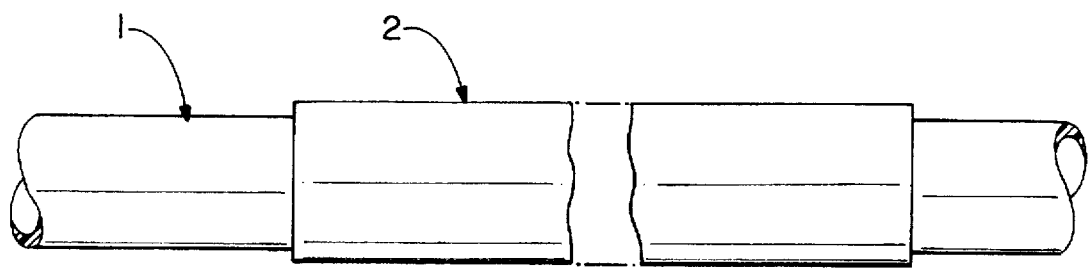
FIG. 1 illustrates a plan view of a length of rigid thermoplastic pipe having a close fitting metal sleeve placed thereon.
Figure 2:
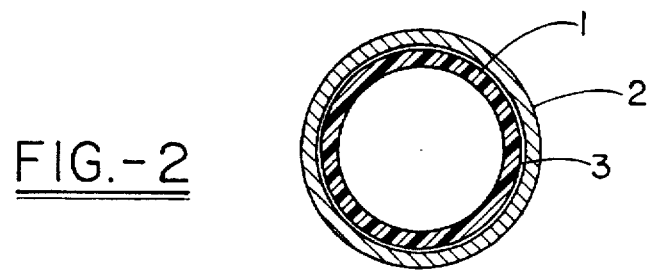
FIG. 2 illustrates a cross sectional view of the rigid thermoplastic pipe with the close fitting metal sleeve as shown in FIG. 1.

Referring to FIG. 1, a rigid thermoplastic pipe (1) which is to be bent is obtained. A length of a close fitting metal sleeve (2) is placed over the rigid thermoplastic pipe. The metal sleeve should be chosen so that the metal sleeve can be slipped over the rigid thermoplastic pipe. Therefore, a small annular gap (3) exists between the inner diameter of the metal sleeve and the outside diameter of the rigid thermoplastic pipe which is to be bent. This gap can be seen in FIG. 2. Preferably, this radial gap should be in the range of approximately 0.007 to 0.023 inches. (0.1778 to 0.5842 mm). The most preferred gap is 0.015 inches (0.381 mm). If the gap is too large, this method does not work due to the fact that without a close fitting sleeve one obtains kinking in the rigid thermoplastic pipe and the benefits of this invention are not realized.

Figure 3:
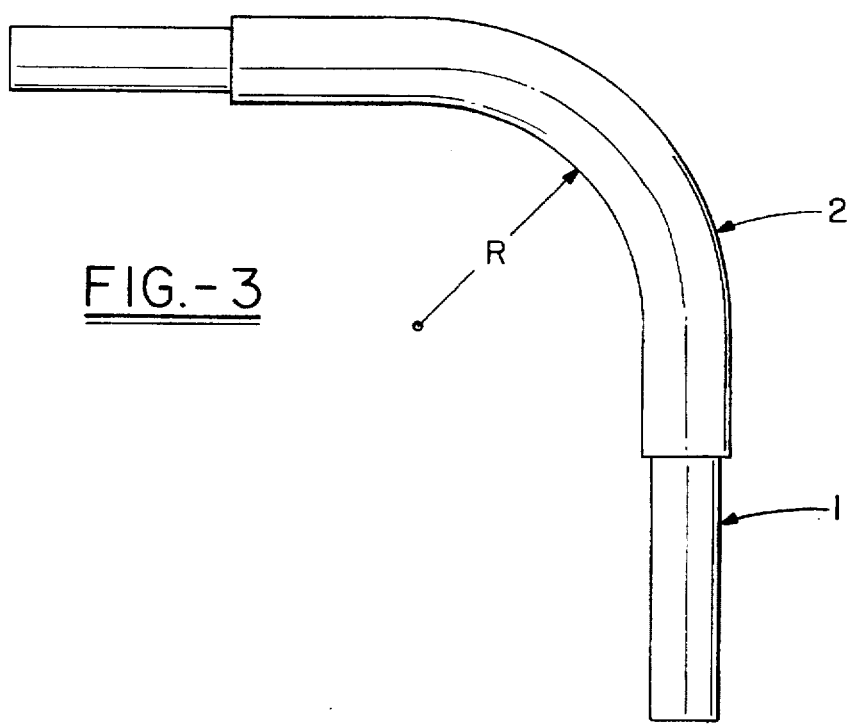
FIG. 3 illustrates a side view of the rigid thermoplastic pipe with the close fitting metal sleeve of FIG. 1 with a three inch radius bend formed according to the method of this invention.

The composite structure comprising the rigid thermoplastic pipe and the close fitting metal sleeve are then bent by any means which can be used to form a small radius bend as shown in FIG. 3. Preferably, a tube bender is used to bend the composite structure. Any tube bender available to those in the art for bending metal tubes can be used. Generally, any commercial tube bender can be used. For example, Tube Bender H824 from the Lakeland Manufacturing Company, as well as the Greenlee 1818 Conduit Bender from the Greenlee Company can be used.

The method of bending the rigid thermoplastic with the close fitting metal sleeve can be carried out in a variety of ambient temperatures. Usually, the method can be used in the normal range of temperatures encountered in the construction industry. Generally, the temperatures can range from approximately 0° Fahrenheit (−17.8° Centigrade) to 180° Fahrenheit (82.2° Centigrade). Preferably, the method is carried out at room temperature.

The rigid thermoplastic pipe can be any rigid thermoplastic pipe. Generally a rigid thermoplastic according to ASTM D-883 is a thermoplastic having a modulus of elasticity, either in flexure or tension, greater than 700 MPa (100,000 psi) at 23° C. (73.4° F.) and 50% relative humidity when tested in accordance with ASTM test methods D-747, D-790, D-638 or D-882. Suitable rigid thermoplastic pipes include pipes made from CPVC, polyvinyl chloride (PVC), acrylonitrile styrene butadiene (ABS), polypropylene (PP), polyvinylidene fluoride (PVDF) and any other rigid pipe made from a thermoplastic material, including blends and alloys of thermoplastic materials. Preferably, rigid thermoplastic CPVC pipe sold under the Corzan™, FlowGuard Gold® and BlazeMaster® trademarks by the licensees of The B.F.Goodrich Company is used. (Corzan™, FlowGuard Gold® and BlazeMaster® are trademarks of The B.F.Goodrich Company). The most preferred rigid thermoplastic pipe is a rigid CPVC pipe sold under the FlowGuard Gold® trademark by the licensees of The B.F. Goodrich Company.

The only limitation in the size of the outer diameter of the rigid thermoplastic pipe is the ability to bend it; if the pipe has too big of an outer diameter, there may not be an easy way to form the bend on the rigid thermoplastic pipe with the metal sleeve. Therefore, the method of the instant invention of bending a rigid thermoplastic pipe is applicable to any rigid thermoplastic pipe having a close fitting metal sleeve, provided that the composite structure could be bent. Preferably, the rigid thermoplastic pipe generally can range in size from approximately one half inch outer diameter to approximately two inches outer diameter. The most preferred size of the rigid thermoplastic pipe is ¾ inch SDR 11 CPVC pipe.

The rigid thermoplastic pipe can be of any desired length. The rigid thermoplastic pipe is cut to the desired length by any means used to cut rigid thermoplastic pipes. Examples of such means include wheel type plastic tubing cutter, ratchet cutter or fine tooth saw. The cut should be made as squarely as possible. Any burrs and filings should be removed from the inside and outside of the rigid thermoplastic pipe using chamfering and deburring techniques known to those of ordinary skill in the art. Preferably, a chamfering tool is used.

The metal sleeve can be any metal sleeve that reinforces the rigid thermoplastic pipe. Examples of metal sleeves which can be used in the practice of this invention include, for example but not limited to sleeves made of aluminum, steel, copper, flexible electrical metallic conduit, or other metallic materials. Metallic electrical flexible conduit is any flexible metallic conduit, coated or uncoated, reinforced or unreinforced. Examples of metallic electrical flexible conduit include conduit sold under the trade name Liquatight® from the Electri-Flex Company, conduit sold under the trade name Ultratight® from the Alflex Corporation, and Liquid Tight Conduit EFLT from the International Metal Hose Company. The most preferred metal sleeve is an aluminum sleeve from the Plymouth Tube Co.

Generally, the metal sleeve can have any thickness so long as it can be bent and that the sleeve has a greater tensile stress than the outer fiber tensile stress of the rigid thermoplastic pipe. Preferably, the metal sleeve has a thickness ranging from approximately 0.049 inch (1.245 mm) to approximately 0.083 inch (2.108 mm). The most preferred thickness of the metal sleeve is 0.049 inches (1.245 mm).

The metal sleeve can be cut to the desired length using any metal cutting tools. Examples of metal cutting tools include wheel cutters, hacksaws and reciprocating saws. Care should be taken in using these devices to ensure that the roundness of the metal sleeve is maintained. The preferred tool used is a wheel cutter. Furthermore, a vise like device which is cushioned can be used for securing the metal sleeve during the cutting process. Once the metal sleeve is cut to its desired length, both the inner and outer diameter of the metal sleeve should be chamfered and deburred, as is known to those of ordinary skill in the art, to insure that the sharp edges of the metal sleeve do not contact the rigid thermoplastic pipe. Preferably, a chamfering tool is used.

As stated above, the metal sleeve is slipped over the rigid thermoplastic pipe. The metal sleeve is chosen so that the sleeve can easily slip over the rigid thermoplastic and the smallest possible annular gap exists between the outer diameter of the rigid thermoplastic material and the metal sleeve. The metal sleeve can be of any desired length so long as the metal sleeve is found in the arc of the desired bend. Moreover, it is perfectly acceptable to have a metal sleeve which is longer than the arc of the desired bend.

The method of the present invention can be used to bend the composite structure anywhere from 1° to 360°. The bend radius to be formed by the method of the instant invention can be predetermined by the length of the metal sleeve in the desired area of the bend as well as the length of the desired arc of the bend. The following mathematical formula can be used to roughly calculate the bend radius:

$$R = \frac{S}{24\sqrt{\frac{L}{(1-S)}}}$$

where R is the bend radius, S is the length of the arc of the bend and L is the chord length.

This method can be simply and easily used when a rigid thermoplastic pipe having a bend is desired. For example, the method can be used in the construction industry during the installation of rigid thermoplastic pipes without the need for cutting the pipe and placing fittings or elbows in the area where a bend is needed. Not only does this method save time, but it is very simple. Also, the method can be used in areas where rigid thermoplastic pipes need bends without fittings because solvent cement use is prohibited.

Furthermore, the invention comprises the composite structure made by the method of bending the rigid thermoplastic pipe having a metal sleeve as set forth herein. This composite structure has better pressure and temperature properties as compared to the rigid thermoplastic pipe itself because the tensile stress of the composite structure is higher than that of the rigid thermoplastic pipe itself. Therefore, the composite structure can sustain pressure and does not fail or crack as rigid thermoplastic pipe does when bent. In addition, when the composite structure is used in a system, the system requires fewer joints and fittings as compared to systems which do not use the composite structure.

There are many uses of the composite structure. For example, the composite structure could be used in underslab installations for hot and cold water supply piping or heating systems because underslab installations preclude usage of elbow joint fitting due to the possibility of leakage at such joints. Additionally, the composite structure can be used in water heaters or coil heaters.

EXAMPLES

In Examples 1-9, ¾ inch (19.05 mm) SDR 11 FlowGuard Gold® CPVC pipe available from the licensees of The B.F. Goodrich Company in a sixteen inch (406.40 mm) length sample having a ten inch (254 mm) aluminum sleeve slipped thereon was used. The aluminum sleeve designated Seamless WW-T-700/6F A26061-T6 was obtained from the Plymouth Tube Company. In Examples 10–12, the same FlowGuard Gold® CPVC pipe was used with a ten inch (254 mm) carbon steel sleeve. The carbon steel sleeve bearing designation A513-S W1020 1.00 O.D.×0.92 ID was obtained from Webco. Examples 4–6 were bent according to the instant invention at room temperature; whereas Examples 7–12 were bent according to the instant invention at 20° F. (−6.7° C.). Examples 1–3 were not bent and are control lengths.

These pipes were subjected to a modified version hydrostatic sustained pressure tests at 180° F. (82.2° C.), set forth in ASTM D-2846, Table 5. Under the ASTM D-2846 test, the sample is subjected to 551 psi pressure (air bath) for six minutes at 180° F. If there is no pressure loss during the 6 minute test period, the sample has passed the test. In the modified version of ASTM D-2846 test, the sample was subjected to 551 psi (air bath) for ten (10) minutes at 180° F. If there is no pressure loss during the ten (10) minute test period, the internal specimen pressure was increased to failure. The burst pressure (psi) is recorded and the hoopstress as defined in ASTM F-412 calculated according to the method of ASTM 2837, Section 3.

TABLE 1

Test Conditions-180° F. (modified ASTM D-2846)

| | 10 min. at 551 | Burst | | |
|---|---|---|---|---|
| Example | psi | psi | Hoopstress | Mode of Failure |
| 1 | Pass | 915 | 4843 | Exposed Pipe |
| 2 | Pass | 950 | 5022 | Exposed Pipe |
| 3 | Pass | 945 | 4960 | Exposed Pipe |
| 4 | Pass | 960 | 5038 | Exposed Pipe |
| 5 | Pass | 970 | 5109 | Exposed Pipe |
| 6 | Pass | 980 | 5107 | Exposed Pipe |
| 7 | Pass | 955 | 4928 | Exposed Pipe |
| 8 | Pass | 965 | 5058 | Exposed Pipe |
| 9 | Pass | 885 | 4772 | Exposed Pipe |
| 10 | Pass | 865 | 4705 | Exposed Pipe |
| 11 | Pass | 930 | 5014 | Exposed Pipe |
| 12 | Fail-8.9 min. | — | — | Exposed Pipe |

Example 12 failed because the CPVC pipe did not meet the manufacturer's specification for such pipe. These Examples in Table 1 illustrate that it is possible to use the instant invention at various temperatures with different metal sleeves to obtain a bend on a rigid thermoplastic pipe. Furthermore, these examples illustrate that the reinforced composite structure does not fail at the bend or along the sleeve. Rather, the composite structure failed where the rigid thermoplastic pipe itself was exposed showing that the resultant composite structure is stronger than the rigid thermoplastic pipe itself.

Example 13–33 in Table 2 show sixteen inch lengths of FlowGuard Gold® CPVC pipe, having various average outside diameters as listed on the table, available from the licensees of The B.F.Goodrich Company, some with sleeves, others without sleeves conditioned and bent at 0° F. (−17.8° C.). The steel and aluminum sleeves used throughout the Examples are from the same manufacturers as the same aluminum and steel sleeves used in Examples 1–12 of Table 1.

TABLE 2

Test Conditions-180° F. (modified ASTM D-2846 Test)

| | | | Burst | |
|---|---|---|---|---|
| Ex. | Description | 10 Min. at 551 psi | psi | Hoopstress | Mode of Failure |
| 13 | ½ in. SDR 11 FlowGuard Gold CPVC Pipe; No sleeve; No Bend; Control | Pass | 1215 | 4904 | Top-Crack |
| 14 | ½ in. SDR 11 FlowGuard Gold CPVC Pipe; No sleeve; No Bend; Control | Pass | 1230 | 4885 | Mid-Crack |
| 15 | ½ in. SDR 11 FlowGuard Gold CPVC Pipe; No sleeve; No Bend; Control | Pass | 1220 | 4933 | Bottom-Crack |
| 16 | ½ in SDR 11 FlowGuard Gold CPVC Pipe; 10 in. Aluminum Sleeve 90° Bend; No Contaminant | Pass | 1210 | 4893 | Exposed Pipe |
| 17 | ½ in. SDR 11 FlowGuard Gold CPVC Pipe; 10 in. Aluminum Sleeve 90° Bend; No Contaminant | Pass | 1230 | 4807 | Exposed Pipe |
| 18 | ½ in. SDR 11 FlowGuard Gold CPVC Pipe; 10 in. Aluminum Sleeve 90° Bend; No Contaminant | Pass | 1220 | 4845 | Exposed Pipe |
| 19 | ½ in. SDR 11 FlowGuard Gold CPVC Pipe; 10 in. Aluminum Sleeve 90° Bend; Contaminant | Pass | 1230 | 4885 | Exposed Pipe |
| 20 | ½ in. SDR 11 FlowGuard Gold CPVC Pipe; 10 in. Aluminum Sleeve 90° Bend; Contaminant | Pass | 1240 | 5014 | Exposed Pipe |
| 21 | ½ in. SDR 11 FlowGuard Gold CPVC Pipe; 10 in. Aluminum Sleeve 90° Bend; Contaminant | Pass | 1215 | 4904 | Exposed Pipe |
| 22 | ¾ in. SDR 11 FlowGuard Gold CPVC Pipe; No Sleeve; No Bend; Control | Pass | 1060 | 5208 | Mid-Crack |
| 23 | ¾ in. SDR 11 FlowGuard Gold CPVC Pipe; No Sleeve; No Bend; Control | Pass | 1045 | 5205 | Mid-Crack |
| 24 | ¾ in. SDR 11 FlowGuard Gold CPVC Pipe; No Sleeve; No Bend; Control | Pass | 1035 | 5156 | Mid-Crack |
| 25 | ¾ in. SDR 11 FlowGuard Gold CPVC Pipe; 10 in. Aluminum Sleeve 90° Bend; No Contaminant | Pass | 1040 | 5110 | Exposed Pipe |
| 26 | ¾ in. SDR 11 FlowGuard Gold CPVC Pipe; 10 in. | Pass | 1035 | 5156 | Exposed Pipe |

TABLE 2-continued

Test Conditions-180° F.
(modified ASTM D-2846 Test)

| Ex. | Description | 10 Min. at 551 psi | Burst psi | Hoopstress | Mode of Failure |
|---|---|---|---|---|---|
|  | Aluminum Sleeve 90° Bend; No Contaminant |  |  |  |  |
| 27 | ¾ in/SDR 11 FlowGuard Gold CPVC Pipe; 10 in. Aluminum Sleeve 90° Bend; No Contaminant | Pass | 1045 | 5135 | Exposed Pipe |
| 28 | ¾ in. SDR 11 FlowGuard Gold CPVC Pipe; 10 in. Aluminum Sleeve; 90° Bend; Contaminant | Pass | 1030 | 4993 | Exposed Pipe |
| 29 | ¾ in. SDR 11 FlowGuard Gold CPVC Pipe; 10 in. Aluminum Sleeve 90° Bend; No Contaminant | Pass | 1040 | 5110 | Exposed Pipe |
| 30 | ¾ in. SDR 11 FlowGuard Gold CPVC Pipe; 10 in. Aluminum Sleeve 90° Bend; No Contaminant | Pass | 1060 | 5287 | Exposed Pipe |
| 31 | ¾ in. SDR 11 FlowGuard Gold CPVC Pipe; 10 in. Steel Sleeve; 90° Bend; Contaminant | Pass | 1045 | 5072 | Exposed Pipe |
| 32 | ¾ in. SDR 11 FlowGuard Gold CPVC Pipe; 10 in. Aluminum Sleeve 90° Bend; No Contaminant | Pass | 1055 | 5262 | Exposed Pipe |
| 33 | ¾ in. SDR 11 FlowGuard Gold CPVC Pipe; 10 in. Aluminum Sleeve 90° Bend; No Contaminant | Pass | 1035 | 5162 | Exposed Pipe |

The purpose for the Examples in Table 2 is to replicate conditions which may be found in the field. These examples in Table 2 show that even a contaminant such as sand in the annular space between the outer diameter of the rigid thermoplastic pipe and the inner diameter of the metal sleeve does not effect the performance of the method of the instant invention.

The following Examples as set forth in Table 3 show the usage of different rigid thermoplastic pipes having a metal sleeve and bent according to the instant invention and subject to the modified version of ASTM F-441 Rigid Plastic Burst Pressure at 73° F. Test Protocols. The test protocol of ASTM F-441 was modified for these examples. In these examples, the pipe was held at 100 psi for sixty (60) minutes. If there was no pressure loss during the 60 minute test period, the internal pressure of the specimen was increased until the pipe failed. The burst pressure was recorded and the hoopstress calculated.

In Examples A–F, various lengths of 1 inch, Schedule 80 Corzan™ CPVC Pipe from the Charlotte Pipe Company was used (Corzan is a trademark of The B.F.Goodrich Company) in the instant invention and tested pursuant to the modified test protocol of ASTM F-441.

TABLE 3

Test Conditions at Room Temperature (about 73° F.)
Modified ASTM F-441

| Examples | Description | 60 min. at 100 psi | Burst psi | Hoopstress | Mode of Failure |
|---|---|---|---|---|---|
| A | 15.75 inch CPVC; No Sleeve-Control | Pass | 2000 | 6322 | No Failure |
| B | 15.75 inch CPVC; No Sleeve-Control | Pass | 2000 | 6404 | No Failure |
| C | 15.75 inch CPVC; No Sleeve-Control | Pass | 2000 | 6322 | No Failure |
| D | 32 inch CPVC; 24 inch Aluminum Sleeve; 90° Bend at 65° F.. | Pass | 2000 | 6256 | No Failure |
| E | 32 inch CPVC; 24 inch Aluminum Sleeve; 90° Bend at 65° F.. | Pass | 2000 | 6271 | No Failure |
| F | 32 inch CPVC; 24 inch Aluminum Sleeve; 90° Bend at 65° F.. | Pass | 2000 | 6441 | No Failure |

Examples G–L in Table 4 show that PVC can be bent according to the instant invention. In these Examples G–L, 1 inch Schedule 80 PVC from the Eslon Company was used according to the instant invention and subjected to the modified ASTM F-441 Tests.

TABLE 4

Test Conditions at Room Temperature (about 73° F.)
Modified ASTM F-441 Test

| Examples | Description | 60 min at 100 psi | Burst psi | Hoopstress | Mode of Failure |
|---|---|---|---|---|---|
| G | 15.75 inch PVC; No sleeve-Control | Pass | 2000 | 6247 | No Failure |
| H | 15.75 inch PVC; No sleeve-Control | Pass | 2000 | 6282 | No Failure |
| I | 15.75 inch PVC; No sleeve-Control | Pass | 2000 | 6163 | No Failure |
| J | 32 inch PVC; 24 inch Aluminum Sleeve; 90° Bend at 65° F. | Pass | 2000 | 6271 | No Failure |
| K | 32 inch PVC; 24 inch Aluminum Sleeve; 90° Bend at 65° F. | Pass | 2000 | 6236 | No Failure |
| L | 32 inch PVC; 24 inch Aluminum Sleeve; 90° Bend at 65° F. | Pass | 2000 | 6317 | No Failure |

Examples M-R in Table 5 illustrate that the instant invention can be used with rigid ABS thermoplastic pipe. These Examples use a 1 inch, Schedule 40 (230 psi) rigid ABS thermoplastic pipe sold under the trade-name Duraplus from the DuraPipe Company. The ABS pipe with aluminum sleeve was bent and subjected to the protocol of the modified ASTM F-441 Tests.

TABLE 5

Test Conditions at Room Temperature (about 73° F.) Modified ASTM F-441 Test

| Examples | Description | Burst 60 min. at 100 psi | psi | Hoopstress | Mode of Failure |
|---|---|---|---|---|---|
| M | 15.75 inch ABS; No Sleeve-Control | Pass | 1430 | 6124 | Full Length Crack |
| N | 15.75 inch ABS; No Sleeve-Control | Pass | 1470 | 6347 | Full Length Crack |
| O | 15.75 inch ABS; No Sleeve-Control | Pass | 1465 | 6274 | Full Length Crack |
| P | 32 inch ABS; 24 inch Aluminum Sleeve; 90° Bend at 65° F. | Pass | 1440 | 6217 | Exposed Pipe |
| Q | 32 inch ABS; 24 inch Aluminum Sleeve; 90° Bend at 65° F. | Pass | 1475 | 6421 | Exposed Pipe |
| R | 32 inch ABS; 24 inch Aluminum Sleeve; 90° Bend at 65° F. | Pass | 1400 | 6094 | Exposed Pipe |

Examples S–X below in Table 6 illustrate the applicability of the method of bending a rigid thermoplastic pipe to PP pipe 1 inch. Schedule 80 polypropylene pipe from Harrison sold under the brand name SuperPro was used in these Examples, along with an aluminum sleeve. The composite structure was bent and tested according to modified ASTM F-441.

TABLE 6

Test Conditions at Room Temperature (about 73° F.) Modified ASTM F-441 Test

| Examples | Description | Burst 60 min. at 100 psi | psi | Hoopstress | Mode of Failure |
|---|---|---|---|---|---|
| S | 15.75 inch PP; No Sleeve-Control | Pass | 1335 | 3926 | Exposed Pipe |
| T | 15.75 inch PP; No Sleeve-Control | Pass | 1340 | 3970 | Exposed Pipe |
| U | 15.75 inch PP; No Sleeve-Control | Pass | 1375 | 4121 | Exposed Pipe |
| V | 32 inch PP; 24 inch Aluminum Sleeve; 90° Bend; 65° F. | Pass | 450 | N.A. | Flare Failure |
| W | 32 inch PP; 24 inch Aluminum Sleeve; 90° Bend; 65° F. | Pass | 475 | N.A. | Flare Failure |
| X | 32 inch PP; 24 inch Aluminum Sleeve; 90° Bend; 65° F. | Pass | 1380 | 4193 | Exposed Pipe |

TABLE 6-continued

Test Conditions at Room Temperature (about 73° F.) Modified ASTM F-441 Test

| Examples | Description | Burst 60 min. at 100 psi | psi | Hoopstress | Mode of Failure |
|---|---|---|---|---|---|

The hoopstress at burst could not be measured for Examples V and W in Table 6 because the samples slipped off the testing apparatus at the point the sample was inserted into the apparatus for testing. Flare Failure listed above means that the rigid thermoplastic pipe failed at the point the instrument used in the testing is inserted into the pipe. However, Example X does indeed demonstrate the benefits of this method. The above examples also illustrate that the method of the instant invention can be used to impart a bend to a rigid polypropylene pipe having a sleeve.

In Examples AA–FF, Table 7, a polyvinylidene fluoride pipe was used. In these particular examples, the PVDF pipe was 1 inch Schedule 80 PVDF from Nibco. This PVDF with aluminum sleeve was tested pursuant to the modified ASTM F-441 protocol set forth above.

TABLE 7

Test Conditions at Room Temperature (about 73° F.) Modified ASTM F-441 Test

| Examples | Description | Burst 60 min. at 100 psi | psi | Hoopstress | Mode of Failure |
|---|---|---|---|---|---|
| AA | 15.75 inch PVDF; No Sleeve-Control | Pass | 2000 | 6236 | No Failure |
| BB | 15.75 inch PVDF; No Sleeve-Control | Pass | 1950 | 6086 | No Failure |
| CC | 15.75 inch PVDF; No Sleeve-Control | Pass | 300 | N.A. | Flare Failure |
| DD | 32 inch PVDF; inch Aluminum Sleeve; 90° Bend at 65° F. | Pass | 1975 | 6243 | No Failure |
| EE | 32 inch PVDF; inch Aluminum Sleeve; 90° Bend at 65° F. | Pass | 1975 | 6278 | No Failure |
| FF | 32 inch PVDF; inch Aluminum Sleeve; 90° Bend at 65° F. | Pass | 1975 | 6125 | No Failure |

Once again, these examples in Table 7 illustrate that the present invention can be used in conjunction with PVDF rigid thermoplastic pipe to form a composite structure which can be bent and does not fail at the bend itself.

In Examples GG through LL, Table 8, a rigid thermoplastic CPVC pipe with a metallic electrical flexible conduit as a sleeve was tested. The CPVC pipe was FlowGuard Gold® CPVC pipe available from the licensees of The B.F. Goodrich Company. The metallic electrical flexible conduit sleeve used in these examples was Liquid Tight Conduit EFLT from the International Metal Hose Company. A sixteen inch (406.4 mm) length of ½ inch, SDR 11 FlowGuard Gold® CPVC pipe was used. The metallic electrical flexible conduit was 10 inches in length. All samples were bent using a Tube Bender H824 from the Lakeland Manufacturing Company using the instant invention to result in a 90° bend at 0° F. (−17.8° C.). Examples GG through II were tested with the flex conduit in place. In Examples JJ through LL the metallic electrical flexible conduit was removed prior to testing and the pipe bent back to the 90° bend by hand.

TABLE 8

Test Conditions at 180° F.
(Modified ASTM D-2846 Test)

| Examples | 10 min, at 551 psi | Burst | | Mode of Failure |
|---|---|---|---|---|
| | | psi | Hoopstress | |
| GG | Pass | 1215 | 4817 | Exposed Pipe |
| HH | Pass | 1225 | 4817 | Exposed Pipe |
| II | Pass | 1210 | 4797 | Exposed Pipe |
| JJ | Pass | 1015 | 4089 | Failed at Deformation |
| KK | Pass | 860 | 3465 | Failed at Deformation |
| LL | Pass | 1040 | 4025 | Failed at Deformation |

As this data illustrates, a rigid thermoplastic pipe with a sleeve bent according to the instant invention can maintain its pressure and temperature bearing properties, while a rigid thermoplastic pipe that is bent and the sleeve removed does not maintain such properties and fails at the bend.

In summary, a novel and unobvious method for bending a rigid thermoplastic pipe and the pipe made therefrom has been described. Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

We claim:

1. A method of bending a rigid thermoplastic pipe without requiring heating the rigid thermoplastic pipe at any point before, during, or subsequent to bending, comprising:

a. providing a metal sleeve having an inner diameter;

b. providing a rigid thermoplastic pipe having an outer diameter the inner diameter of said metal sleeve and the outer diameter of said rigid thermoplastic pipe being selected such that a radial gap of approximately 0.007 inches to 0.023 inches exists between said metal sleeve and said rigid thermoplastic pipe when said metal sleeve is positioned over said rigid thermoplastic pipe;

c. positioning said metal sleeve over said rigid thermoplastic pipe;

and d. bending said pipe along said sleeve to form a bend of desired radius.

2. The method of claim 1, wherein said pipe is bent along said sleeve at an angle of from about 1° to about 360°.

3. The method of claim 1 wherein said rigid thermoplastic pipe is selected from the group comprising: PVC, CPVC, PVDF, ABS, or PP or blends or alloys thereof.

4. The method of claim 3, wherein said pipe is bent along said sleeve at a temperature from about −17.8° C. to about 82.2° C.

5. The method of claim 4, wherein said metal sleeve comprises steel, aluminum, or copper.

6. The method of claim 1, wherein said pipe with sleeve is bent at the center of the sleeve.

7. The method of claim 1 wherein said metal sleeve is chosen from the group comprising steel, aluminum, copper or metallic electrical flexible conduit.

8. The method of claim 1, wherein said rigid thermoplastic pipe is CPVC and the sleeve is aluminum.

9. The method of claim 1, wherein said pipe is bent along said sleeve at ambient condition.

* * * * *